US 9,185,132 B1

(12) United States Patent
Gauvin

(10) Patent No.: US 9,185,132 B1
(45) Date of Patent: Nov. 10, 2015

(54) TECHNIQUES FOR SENSOR BASED ATTACK REFLECTION

(75) Inventor: William J. Gauvin, Leominster, MA (US)

(73) Assignee: Symantec Corporation, Mountain View, CA (US)

( * ) Notice: Subject to any disclaimer, the term of this patent is extended or adjusted under 35 U.S.C. 154(b) by 529 days.

(21) Appl. No.: 13/005,280

(22) Filed: Jan. 12, 2011

(51) Int. Cl.
H04L 29/06 (2006.01)

(52) U.S. Cl.
CPC .................................. H04L 63/1491 (2013.01)

(58) Field of Classification Search
CPC ............ H04L 63/1491; H04L 63/1425; H04L 643/1441
See application file for complete search history.

(56) References Cited

U.S. PATENT DOCUMENTS

| | | | | |
|---|---|---|---|---|
| 6,088,803 | A * | 7/2000 | Tso et al. | 726/22 |
| 6,219,706 | B1 * | 4/2001 | Fan et al. | 709/225 |
| 6,981,155 | B1 * | 12/2005 | Lyle et al. | 726/22 |
| 7,640,585 | B2 * | 12/2009 | Lee et al. | 726/22 |
| 7,804,962 | B2 * | 9/2010 | Roy et al. | 380/278 |
| 7,907,888 | B2 * | 3/2011 | Sun et al. | 455/1 |
| 2005/0050353 | A1 * | 3/2005 | Thiele et al. | 713/201 |
| 2005/0160478 | A1 * | 7/2005 | Ramaiah et al. | 726/14 |
| 2006/0150250 | A1 * | 7/2006 | Lee et al. | 726/23 |
| 2007/0094494 | A1 * | 4/2007 | Banerjee et al. | 713/157 |
| 2008/0144835 | A1 * | 6/2008 | Roy et al. | 380/278 |
| 2009/0325478 | A1 * | 12/2009 | Sun et al. | 455/1 |
| 2012/0023572 | A1 * | 1/2012 | Williams et al. | 726/13 |

OTHER PUBLICATIONS

Definition of Computer Memory, May 2013, Encyclopedia Britannica.*
Payload Definition, California Department of Industrial Relations, http://www.dir.ca.gov/dwc/eams/EAMSPresentTermSolutionDocumentRepository/Payload%20Definition.pdf.*
Liu et al.; Attack-Resistant Location Estimation in Wireless Sensor Networks; Published in: Journal ACM Transactions on Information and System Security (TISSEC) TISSEC Homepage archive; vol. 11 Issue 4, Jul. 2008; ACM Digital Library.*
Vigna et al.; An intrusion detection tool for AODV-based ad hoc wireless networks; Published in: Computer Security Applications Conference, 2004; 20th Annual Date of Conference: Dec. 6-10, 2004; pp. 16-27; IEEE Xplore.*
Corrado Leita, PhD Thesis to obtain the title of Doctor in Sciences of the University of Nice-Sophia Antipolis; Specialty: Computer Science; SGNET Automated protocol learning for the observation of malicious threats; Dec. 4, 2008; pp. 1-174.

* cited by examiner

Primary Examiner — Bradley Holder
(74) Attorney, Agent, or Firm — Wilmer Cutler Pickering Hale and Dorr LLP

(57) ABSTRACT

Techniques for sensor based attack reflection are disclosed. In one particular exemplary embodiment, the techniques may be realized as a method for sensor based attack reflection comprising detecting an attack at a sensor, identifying a portion of memory associated with the attack, redirecting at least the identified portion of memory to a secure network using an access point, extracting data associated with the attack on the secure network, redirecting a response to the attack from the secure network to the sensor, transmitting the response from the sensor to a network location associated with the attack, receiving a subsequent attack communication based on the response at the access point, redirecting the subsequent attack communication to the secure network, and analyzing the subsequent attack communication.

17 Claims, 4 Drawing Sheets

TECHNIQUES FOR SENSOR BASED ATTACK REFLECTION

FIELD OF THE DISCLOSURE

The present disclosure relates generally to sensor based attack management and, more particularly, to techniques for sensor based attack reflection.

BACKGROUND OF THE DISCLOSURE

Sensors such as, for example, honeypots, may traditionally be deployed external to a firewall (e.g., on a Demilitarized Zone (DMZ) network). However, more sophisticated attackers may have sufficient information to determine that network information (e.g., addresses and ports) associated with a DMZ network are not the intended targets. This may render honeypots or sensors ineffective for detecting attacks. Furthermore, some attacks may initiate from inside an internal network and may be directed towards a separate portion of an internal network. For example, a contractor or disgruntled employee with access to a corporate engineering LAN may attempt to access an accounting LAN of the corporation. Sensors located external to an internal network are ineffective to detect such attacks. Additionally, a sensor located on an internal network may have a limited or no ability to perform diagnostic actions during an attack because of a risk of exposing an internal network to malware or other threats.

In view of the foregoing, it may be understood that there may be significant problems and shortcomings associated with current sensor based attack management technologies.

SUMMARY OF THE DISCLOSURE

Techniques for sensor based attack reflection are disclosed. In one particular exemplary embodiment, the techniques may be realized as a method for sensor based attack reflection comprising detecting an attack at a sensor, identifying a portion of memory associated with the attack, redirecting at least the identified portion of memory to a secure network using an access point, extracting data associated with the attack on the secure network, redirecting a response to the attack from the secure network to the sensor, transmitting the response from the sensor to a network location associated with the attack, receiving a subsequent attack communication based on the response at the access point, redirecting the subsequent attack communication to the secure network, and analyzing the subsequent attack communication.

In accordance with other aspects of this particular exemplary embodiment, the sensor may comprise a honeypot.

In accordance with further aspects of this particular exemplary embodiment, the secure network may comprise a DMZ subnetwork.

In accordance with additional aspects of this particular exemplary embodiment, the secure network may comprises a remote secure network of at least one of: a service provider, a security solution provider, and a software vendor.

In accordance with additional aspects of this particular exemplary embodiment, the attack may comprise an injection exploit.

In accordance with additional aspects of this particular exemplary embodiment, the sensor may be located on an intranet.

In accordance with additional aspects of this particular exemplary embodiment, extracting data associated with the attack on the secure network may comprise using a shell code extractor.

In accordance with additional aspects of this particular exemplary embodiment, the techniques may include tagging and recording the identified portion of memory.

In accordance with additional aspects of this particular exemplary embodiment, detecting the attack at the sensor may comprise detecting a presence of shell codes.

In accordance with additional aspects of this particular exemplary embodiment, redirecting the identified portion of memory to the secure network using the access point may comprise providing an attribute associated with the identified portion of memory including at least one of: a source IP address, a destination IP address, a source port, a destination port, a TCP transaction, a TCP management packet, a TCP packet with a payload, and a TCP segment characteristic.

In accordance with additional aspects of this particular exemplary embodiment, redirecting a response to the attack from the secure network to the sensor may comprise forwarding a request of the attack to download malware.

In accordance with additional aspects of this particular exemplary embodiment, analyzing the subsequent attack communication may comprise analyzing downloaded malware.

In accordance with additional aspects of this particular exemplary embodiment, redirecting the response to the attack from the secure network to the sensor may comprise using an access point to redirect the response to the sensor.

In accordance with additional aspects of this particular exemplary embodiment, the access point may alter the response from the secure network to the sensor to appear to an attacker that the response came from the sensor.

In accordance with additional aspects of this particular exemplary embodiment, altering the response may comprise ensuring an FTP request includes control channel address and port information associated with the sensor.

In accordance with additional aspects of this particular exemplary embodiment, redirecting a response to the attack from the secure network to the sensor may comprise sending the response directly to the sensor from the secure network.

In accordance with additional aspects of this particular exemplary embodiment, the access point may comprise a gateway.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing the method.

In another particular exemplary embodiment, the techniques may be realized as an article of manufacture for sensor based attack reflection, the article of manufacture comprising at least one non-transitory processor readable medium, and instructions stored on the at least one medium. The instructions may be configured to be readable from the at least one medium by at least one processor and thereby cause the at least one processor to operate so as to detect an attack at a sensor, identify a portion of memory associated with the attack, redirect at least the identified portion of memory to a secure network using an access point, extract data associated with the attack on the secure network, redirect a response to the attack from the secure network to the sensor, transmit the response from the sensor to a network location associated with the attack, receive a subsequent attack communication based on the response at the access point, redirect the subsequent attack communication to the secure network, and analyze the subsequent attack communication.

In yet another particular exemplary embodiment, the techniques may be realized as a system for sensor based attack reflection comprising one or more processors communicatively coupled to a network, wherein the one or more processors may be configured to detect an attack at a sensor, identify a portion of memory associated with the attack, redirect at least the identified portion of memory to a secure network using an access point, extract data associated with the attack on the secure network, redirect a response to the attack from the secure network to the sensor, transmit the response from the sensor to a network location associated with the attack, receive a subsequent attack communication based on the response at the access point, redirect the subsequent attack communication to the secure network, and analyze the subsequent attack communication.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
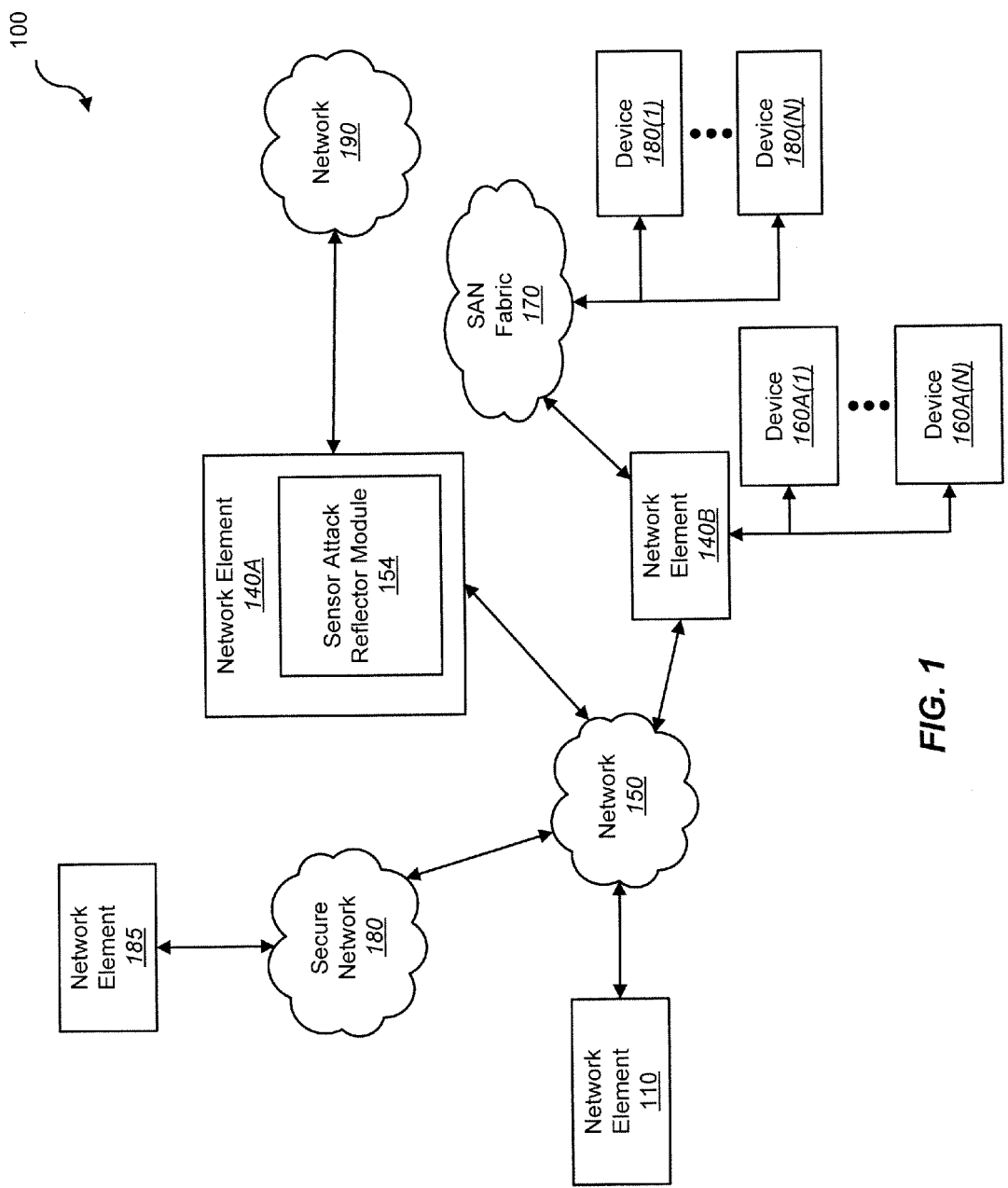
FIG. 1 shows a block diagram depicting a network architecture containing a platform for sensor based attack reflection in accordance with an embodiment of the present disclosure.

FIG. 1 shows a block diagram depicting a network architecture 100 for sensor based attack reflection in accordance with an embodiment of the present disclosure. FIG. 1 is a simplified view of network architecture 100, which may include additional elements that are not depicted. Network architecture 100 may contain network elements 110 and 140A and 140B as well as network element 185 (one or more of which may be implemented using computer system 200 shown in FIG. 2). Network element 110 may be communicatively coupled to a network 150. Network element 140A may be communicatively coupled to networks 190 and 150. Network element 1403 may be communicatively coupled to storage devices 160A(1)-(N). Network element 140B may be communicatively coupled to a SAN (Storage Area Network) fabric 170. SAN fabric 170 may support access to storage devices 180(1)-(N) by network element 140B, and by network element 110 via network 150.

The description below describes network elements, computers, and/or components of a system and method for sensor based attack reflection that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 2:
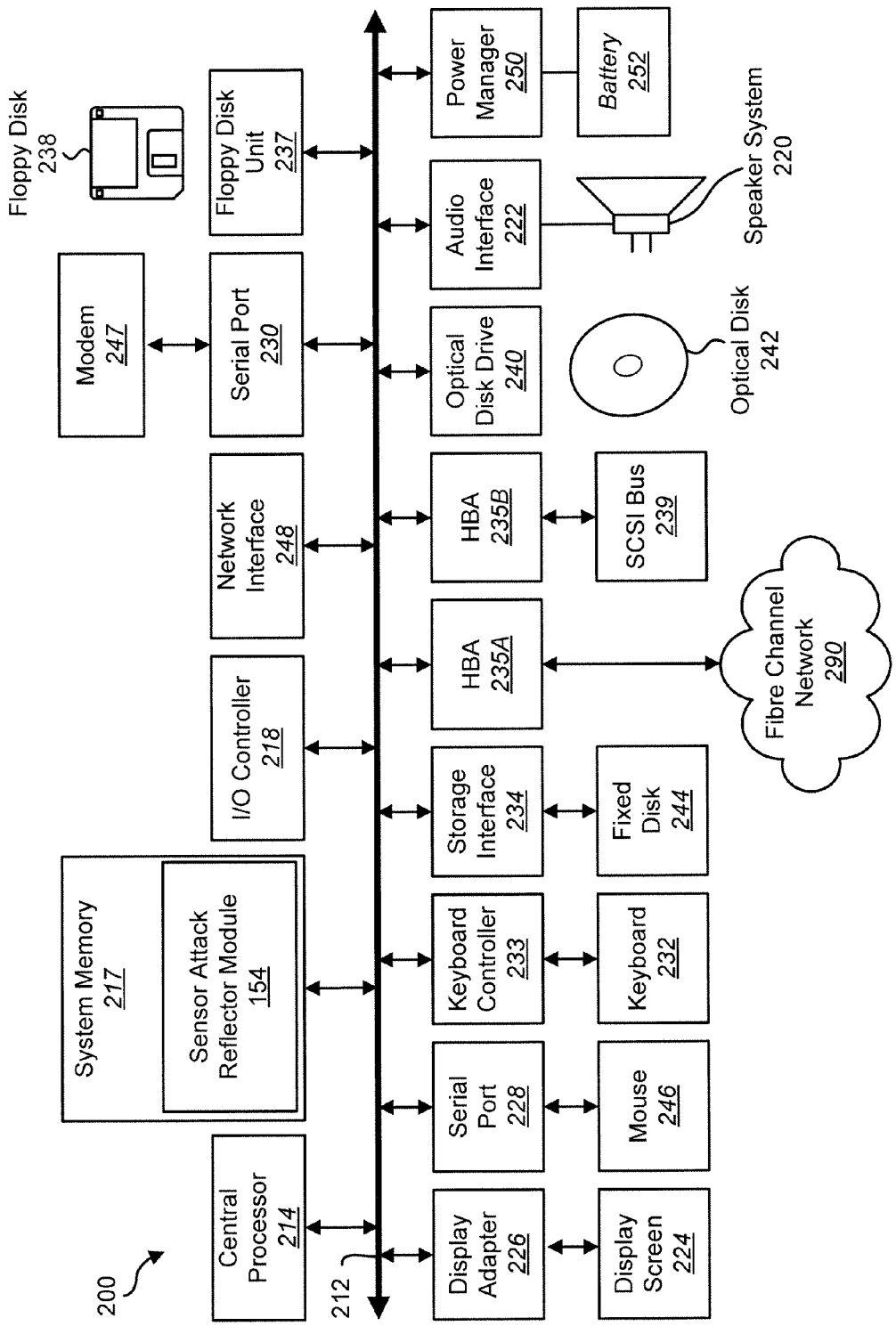
FIG. 2 depicts a block diagram of a computer system in accordance with an embodiment of the present disclosure.

With reference to computer system 200 of FIG. 2, modem 247, network interface 248, or some other method may be used to provide connectivity from one or more of network element 110 and network element 185 to network 150. Network element 110 may be able to access information on network elements 140A or 140B using, for example, a web browser or other client software. Such a client may allow network element 110 to access data hosted by network element 140A or 140B or one of storage devices 160A(1)-(N) and/or 180(1)-(N).

Networks 150, 180, and 190 may be local area networks (LANs), wide area networks (WANs), the Internet, cellular networks, satellite networks, or other networks that permit communication between network elements 110, 185, and 140, and other devices communicatively coupled to networks 150, 180, and 190. Networks 150, 180, and 190 may further include one, or any number, of the exemplary types of networks mentioned above operating as a stand-alone network or in cooperation with each other. Networks 150, 180, and 190 may utilize one or more protocols of one or more clients or servers to which they are communicatively coupled. Networks 150, 180, and 190 may translate to or from other protocols to one or more protocols of network devices. Although networks 150, 180, and 190 are each depicted as one network, it should be appreciated that according to one or more embodiments, networks 150, 180, and 190 may each comprise a plurality of interconnected networks.

Storage devices 160A(1)-(N) and/or 180(1)-(N) may be network accessible storage and may be local, remote, or a combination thereof to network element 140B and SAN Fabric 170. Storage devices 160A(1)-(N) and/or 180(1)-(N) may utilize a redundant array of inexpensive disks ("RAID"), magnetic tape, disk, a storage area network ("SAN"), an Internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N) and/or 180 (1)-(N) may be used for backup or archival purposes.

According to some embodiments, network element 110 may be a sensor, a honeypot, a honeyfarm, or another device or virtual device coupled via a wireless or wired connection to network 150. Network element 110 may receive data from user input, a database, a file, a web service, and/or an application programming interface.

According to some embodiments, network element 110 may detect an attack. Detection may be performed by one or more methods including, but not limited to, detecting shell codes in a stream using regular expressions, detecting tainted memory, and detecting instruction pointers to non-executable portions of memory. Network element 110 may contain or be communicatively coupled to a sample factory which may be used to handle network interactions (e.g., respond to attacks). Network element 110 may also contain one or more Finite State Machines (FSMs) used to handle network interactions.

Network elements 140A and 140B may be gateways, access points, application servers, archival platforms, backup servers, network storage devices, media servers, email servers, document management platforms, enterprise search servers, or other devices communicatively coupled to network 150. Network elements 140A and 140B may utilize one of storage devices 160A(1)-(N) and/or 180(1)-(N) for the storage of application data, backup data, or other data. Network elements 140A and 140B may be hosts, such as an application server, which may process data traveling between network elements 110(N) and a backup platform, a backup process, and/or storage. According to some embodiments, network elements 140A and 140B may be platforms used for backing up and/or archiving data. Network element 140A may be a gateway or an access point on an intranet.

According to some embodiments, network element 185 may represent one or more devices, servers, or virtual devices connected to secure network 180. Secure network 180 may be a DMZ network. Network element 185 may include or more tools and/or devices for extracting, handling, and/or analyzing data associated with attacks such as malware. For example, network element 185 may contain or access a shell code extractor for extracting shell codes and payloads and emulating their behavior. According to one or more embodiments, a secure network or DMZ may be a remote third party site which may offer malware analysis capabilities (e.g., a service provider, a security solution provider, and/or a software vendor).

Network element 140A may contain sensor attack reflector module 154. According to one or more embodiments, network element 140A may be part of an implementation of SGNET. According to some embodiments, sensor attack reflector module 154 may track network element 110 (e.g., a registered honeypot) and may store its active connections state (e.g., via a TCP based protocol such as Peiros). When an attack (e.g., an injection exploit) is detected within network element 110 (e.g., by a sample factory contained in or associated with network element 110), the associated portion of data associated with the attack such as, for example, the injection code, is identified and handed off to network element 185 via sensor attack reflector module 154. According to some embodiments, identification may include the entire network traffic for a specific network transaction such as, for example, a TCP connection request, one or more TCP management packets, one or more TCP packets with payloads (e.g., a TCP packet with a payload containing injected code), and other network transaction data. Network element 110 and/or sensor attack reflector module 154 may record and/or tag portions of memory associated with an attack prior to notifying network element 185. Included in the notification bundle may be one or more other attack communication attributes including, but not limited to, the source and destination IP addresses and ports, as well as the TCP segment characteristics. The reflection of network transaction data from a sensor or a honeypot (e.g., network element 110) to a secure network may allow a network element (e.g., network element 185) on a secure network to generate the correct responses. According to some embodiments, only the data payload may be sent or reflected to a secure network. According to some embodiments, a data payload may be sent wrapped as an executable (which may be a format used by an analysis tool).

Network element 185 may receive the notification bundle and may use one or more tools to analyze the communication, classify the communication, and prepare a response. For example, network element 185 may use a shell code extractor to extract a payload and emulate the behavior of the attack. Network element 185 may prepare a response to the attack communication. For example, the attack may be an injection exploit containing shell code to cause downloading of malware. Network element 185 may prepare a response to initiate an FTP download of the malware. According to some embodiments, the prepared response may be relayed by an access point or gateway (e.g., sensor attack reflector module 154) from a secure network 180 to a sensor that is the target of the attack (e.g., network element 110). According to some embodiments, the prepared response may be sent from a secure network 180 directly to a sensor that is the target of the attack (e.g., network element 110). The response may be altered or configured (e.g., by network element 185 or by sensor attack reflector module 154) to appear to an attacker that the response came from the sensor being attacked (e.g., network element 110). Altering the response may include ensuring that an FTP request includes control channel address and port information associated with the sensor. The sensor (network element 110) may essentially act as a proxy to relay the altered response (e.g., an unpacked malware request) back to the attacker.

A gateway or access point (e.g., sensor attack reflector module 154) may receive a subsequent communication (e.g., downloaded malware) based on the altered response. Sensor attack reflector module 154 may redirect the subsequent attack communication to secure network 180 using filters. Network element 185 may extract and collect data (e.g., malware) associated with the attack safely on secure network 180. The data associated with the attack may be analyzed to identify signatures, behavior, and other attributes.

By tracking connections to sensors and reflecting the virtual communication channel to a DMZ when an attack is detected, Sensor attack reflector module 154 may allow positioning of a sensor on an intranet and extraction and collection of malware contained within a secure network or DMZ.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, sensor attack reflector module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
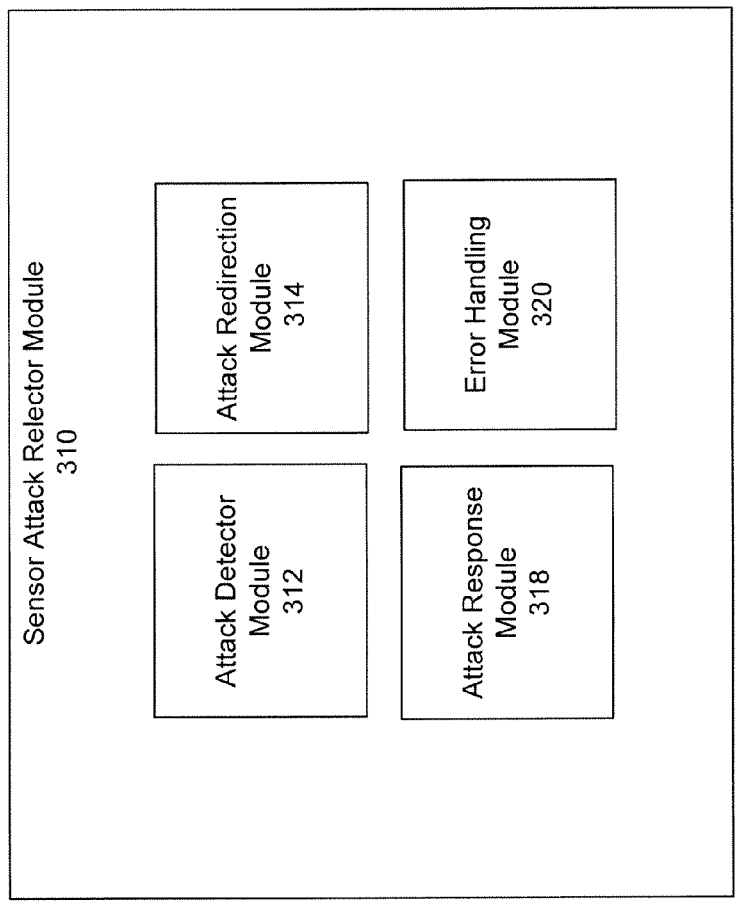
FIG. 3 shows a module for sensor based attack reflection in accordance with an embodiment of the present disclosure.

Referring to FIG. 3, there is shown a sensor attack reflector module 310 in accordance with an embodiment of the present disclosure. As illustrated, the sensor attack reflector module 310 may contain one or more components including attack detector module 312, attack redirection module 314, attack response module 318, and error handling module 320.

Attack detector module 312 may detect an attack. Detection may be performed by one or more methods including, but not limited to, detecting shell codes in a stream using regular expressions, detecting tainted memory, and detecting instruction pointers to non-executable portions of memory. Attack detector module 312 may contain or be communicatively coupled to a sample factory which may be used to handle network interactions (e.g., respond to attacks). Attack detector module 312 may also contain one or more Finite State Machines (FSMs) used to handle network interactions.

Attack redirection module 314 may track one or more sensors (e.g., a registered honeypot) and may store its active connections state (e.g., via a TCP based protocol such as Peiros). When an attack (e.g., an injection exploit) is detected within a sensor (e.g., by a sample factory contained in or associated with a sensor), the associated portion of data associated with the attack such as, for example, the injection code, may be identified and handed off to attack response module 318 via attack redirection module 314. Attack detector module 312 and/or attack redirection module 314 may record and/or tag portions of memory associated with an attack prior to notifying attack response module 318. According to some embodiments, identification may include the entire network traffic for a specific network transaction such as, for example, a TCP connection request, one or more TCP management packets or control packets, one or more TCP packets with payloads (e.g., a TCP packet with a payload containing injected code), and other network transaction data. Included in the notification bundle may be one or more other attack communication attributes including, but not limited to, the source and destination IP addresses and ports, as well as the TCP segment characteristics. The reflection of network transaction data from a sensor or a honeypot (e.g., Attack detector module 312) to a secure network may allow a network element (e.g., attack response module 318) on a secure network to generate the correct responses. According to some embodiments, only the data payload may be sent Or reflected to a secure network. According to some embodiments, a data payload may be sent wrapped as an executable (which may be a format used by an analysis tool).

Attack response module 318 (e.g., a module on a network element of a secure network such as network element 185 of FIG. 1) may receive the notification bundle and may use one or more tools to analyze the communication, classify the communication, and prepare a response. For example, attack response module 318 may use a shell code extractor to extract a payload and emulate the behavior of the attack. Attack response module 318 may perform protocol emulation to analyze the communication, classify the communication, and prepare a response. Attack response module 318 may prepare a response to the attack communication. For example, the attack may be an injection exploit containing shell code to cause downloading of malware. Attack response module 318 may prepare a response to initiate an FTP download of the malware. According to some embodiments, the prepared response may be relayed by an access point or gateway (e.g., attack redirection module 318 and/or sensor attack reflector module 154 of FIG. 1) from a DMZ or a secure network to a sensor that is the target of the attack. According to some embodiments, the prepared response may be sent from a secure network directly to a sensor that is the target of the attack. The response may be altered or configured (e.g., by attack response module 318 and/or attack redirection module 314) to appear to an attacker that the response came from the sensor being attacked (e.g., sensor attack reflector module 154 of FIG. 1 may fix up the response to appear as if it were generated by network element 110 of FIG. 1, prior to relaying the response to network element 110). Altering the response may include ensuring that an FTP request includes control channel address and port information associated with the sensor. The sensor may essentially act as a proxy to relay the altered or configured response (e.g., an unpacked malware request with identifying attributes changed to appear as if it originated from the sensor under attack) back to the attacker.

Error handling module 320 may handle one or more errors and/or reporting and logging associated with sensor based attack reflection including, but not limited to, errors with attack detection, attack redirection, and attack responses.

Figure 4:
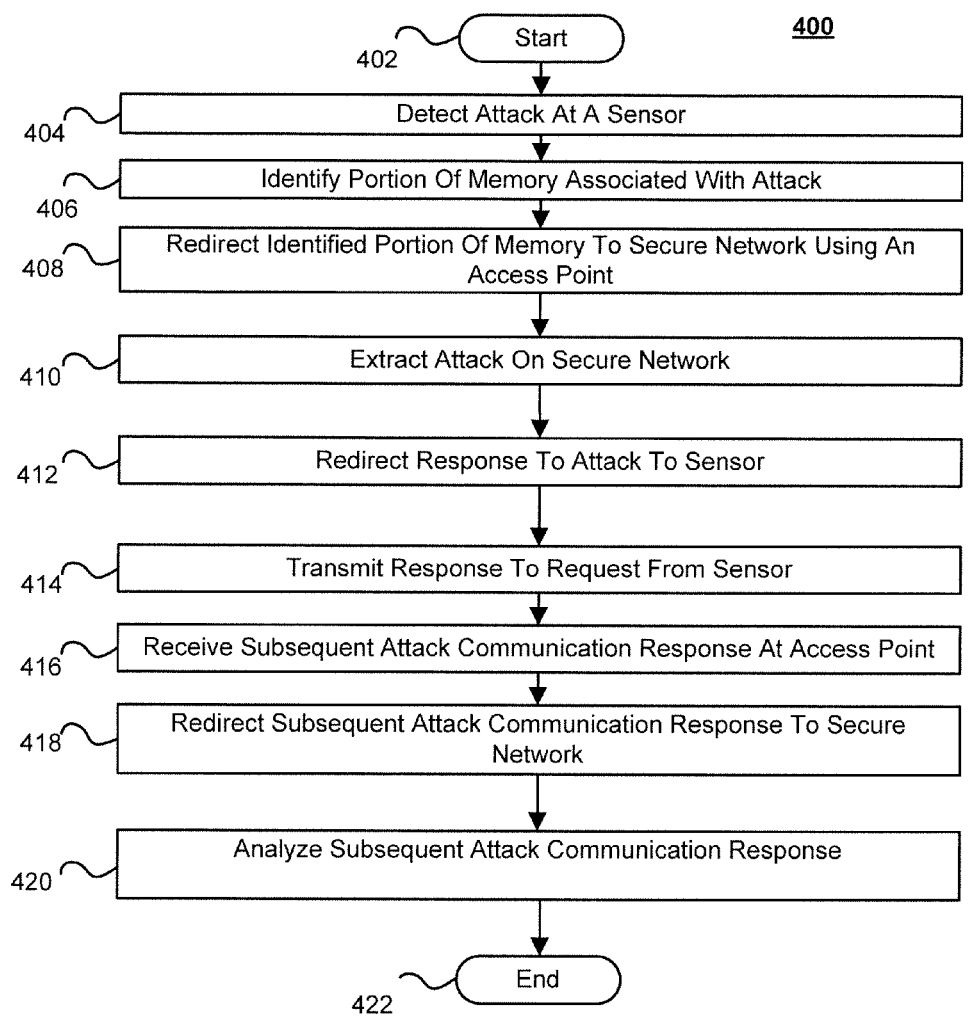
FIG. 4 depicts a method for sensor based attack reflection in accordance with an embodiment of the present disclosure.

Referring to FIG. 4, there is depicted a method 400 for sensor based attack reflection in accordance with an embodiment of the present disclosure. At block 402, the method 400 may begin.

At block 404, an attack may be detected at a sensor. Attack detection may be performed using one or more FSMs and/or sample factories. Attack detection may include, but is not limited to, detecting shell codes in a stream using regular expressions, detecting tainted memory, and detecting instruction pointers to non-executable portions of memory.

At block 406, portions of memory associated with an attack may be identified. This may include recording and/or tagging portions of memory associated with an attack. Other attack communication attributes including, but not limited to, the source and destination IP addresses and ports, as well as the TCP segment characteristics may be recorded. According to some embodiments, identification may include the entire network traffic for a specific network transaction such as, for example, a TCP connection request, one or more TCP management packets or control packets, one or more TCP packets with payloads (e.g., a TCP packet with a payload containing injected code), and other network transaction data. Included in the notification bundle may be one or more other attack communication attributes including, but not limited to, the source and destination IP addresses and ports, as well as the TCP segment characteristics. The reflection of network transaction data from a sensor or a honeypot to a secure network may allow a network element on a secure network to generate the correct responses.

At block 408, at least the identified portions of memory may be identified and handed off by a gateway or access point to a network element (e.g., a shell code extractor) on a DMZ. According to some embodiments, only the data payload may be sent or reflected to a secure network. According to some embodiments, a data payload may be sent wrapped as an executable (which may be a format used by an analysis tool).

At block 410, one or more tools may be used on a secure network to analyze the attack communication, classify the communication, and prepare a response. For example, a shell code extractor may be used to extract a payload and emulate the behavior of the attack. A response may be prepared to the attack communication. For example, the attack may be an injection exploit containing shell code to cause downloading of malware. A response may be prepared to initiate an FTP download of the malware.

At block 412, a prepared response may be relayed by an access point or gateway from a DMZ or a secure network to a sensor that is the target of the attack. According to some embodiments, the prepared response may be sent from a secure network directly to a sensor that is the target of the attack.

At block 414, the response may be altered (e.g., by a host on the DMZ or by the access point or gateway) to appear to an attacker that the response came from the sensor being attacked. Altering the response may include ensuring that an FTP request includes control channel address and port information associated with the sensor.

At block 416, the sensor may essentially act as a proxy to relay the altered response (e.g., an unpacked malware request) back to the attacker.

At block 418, a gateway or access point may receive a subsequent communication (e.g., downloaded malware) based on the altered response. The gateway or access point may redirect the subsequent attack communication to secure network using filters or other mechanisms.

At block 420, a network element on a secure network may extract and collect data (e.g., malware) associated with the attack. The data associated with the attack may be analyzed to identify signatures, behavior, and other attributes.

By tracking connections to sensors and reflecting the virtual communication channel to a DMZ when an attack is detected, it may allow positioning of a sensor on an intranet and extraction and collection of malware contained within a secure network or DMZ.

At block 422, the method 400 may end.

At this point it should be noted that sensor based attack reflection in accordance with the present disclosure as described above typically involves the processing of input data and the generation of output data to some extent. This input data processing and output data generation may be implemented in hardware or software. For example, specific electronic components may be employed in a sensor based attack reflection module or similar or related circuitry for implementing the functions associated with sensor based attack reflection in accordance with the present disclosure as described above. Alternatively, one or more processors operating in accordance with instructions may implement the functions associated with sensor based attack reflection in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for sensor based attack reflection comprising:
   detecting an attack at a sensor, the sensor being internal to a firewall on a network;
   identifying a portion of memory associated with the attack;
   redirecting, using an access point separate from the sensor, only a data payload of at least the identified portion of memory from the network to a secure network;
   extracting data associated with the attack, on the secure network;
   altering, using the access point, a response to the attack to appear to an attacker that the response came from the sensor;

redirecting, using the access point, the response to the attack, from the secure network to the sensor;

transmitting the response from the sensor to a network location associated with the attack;

receiving, by the access point, a subsequent attack communication based on the response;

redirecting the subsequent attack communication to the secure network; and analyzing the subsequent attack communication.

2. The method of claim 1, wherein the sensor comprises a honeypot.

3. The method of claim 1, wherein the secure network comprises a Demilitarized Zone (DMZ) subnetwork.

4. The method of claim 1, wherein the secure network comprises a remote secure network of at least one of: a service provider, a security solution provider, and a software vendor.

5. The method of claim 1, wherein the attack comprises an injection exploit.

6. The method of claim 1, wherein extracting, on the secure network, data associated with the attack comprises using a shell code extractor.

7. The method of claim 1, further comprising tagging and recording the identified portion of memory.

8. The method of claim 1, wherein detecting the attack at the sensor comprises detecting a presence of shell codes.

9. The method of claim 1, wherein redirecting, using the access point, the identified portion of memory to the secure network further comprises providing an attribute associated with the identified portion of memory including at least one of: a source Internet Protocol (IP) address, a destination Internet Protocol (IP) address, a source port, a destination port, a Transmission Control Protocol (TCP) transaction, a TCP management packet, a TCP packet with a payload, and a TCP segment characteristic.

10. The method of claim 1, wherein redirecting the response to the attack from the secure network to the sensor comprises forwarding a request of the attack to download malware.

11. The method of claim 1, wherein analyzing the subsequent attack communication comprises analyzing downloaded malware.

12. The method of claim 1, wherein altering the response to the attack comprises ensuring an (File Transfer Protocol) FTP request includes control channel address and port information associated with the sensor.

13. The method of claim 1, wherein altering the response comprises modifying an File Transfer Protocol (FTP) request to include at least one of: a control channel address associated with the sensor and port information associated with the sensor.

14. The method of claim 1, wherein redirecting the response to the attack, from the secure network to the sensor, comprises sending the response directly to the sensor from the secure network.

15. The method of claim 1, wherein the access point comprises a gateway.

16. An article of manufacture for sensor based attack reflection, the article of manufacture comprising:

at least one non-transitory computer processor readable medium; and instructions stored on the at least one medium, the instructions are configured to be readable from the at least one medium by at least one computer processor and thereby, when executed by the at least one computer processor, cause the at least one computer processor to operate so as to:

detect an attack at a sensor the sensor being internal to a firewall on a network;

identify a portion of memory associated with the attack;

redirect, using an access point separate from the sensor, only a data payload of at least the identified portion of memory from the network to a secure network;

extract data associated with the attack, on the secure network;

alter, using the access point, a response to the attack to appear to an attacker that the response came from the sensor;

redirect, using the access point, the response to the attack, from the secure network to the sensor;

transmit the response from the sensor to a network location associated with the attack;

receive, by the access point, a subsequent attack communication based on the response;

redirect the subsequent attack communication to the secure network; and analyze the subsequent attack communication.

17. A system for sensor based attack reflection comprising:

one or more computer processors communicatively coupled to a network, the one or more computer processors are configured to:

detect an attack at a sensor, the sensor being internal to a firewall on a network;

identify a portion of memory associated with the attack;

redirect, using an access point separate from the sensor, only a data payload of at least the identified portion of memory from the network to a secure network;

extract data associated with the attack, on the secure network;

alter, using the access point, a response to the attack to appear to an attacker that the response came from the sensor;

redirect, using the access point, the response to the attack, from the secure network to the sensor;

transmit the response from the sensor to a network location associated with the attack;

receive, by the access point, a subsequent attack communication based on the response;

redirect the subsequent attack communication to the secure network; and analyze the subsequent attack communication.

* * * * *